Patented July 26, 1938

2,124,950

UNITED STATES PATENT OFFICE 2,124,950

FORMED MINERAL MIXTURE

Merle Douglas Knapheide, Paul Caldwell, and Wallace P. Elmslie, Quincy, Ill., assignors to Moorman Manufacturing Company, Chicago, Ill., a corporation of Illinois No Drawing. Application December 22, 1930, Serial No. 504,212

6 Claims. (Cl. 99—6)

The present invention relates to formed mineral mixtures of the type which is used in connection with the feeding of farm animals and poultry.

It has long been recognized that there is a deficiency of mineral elements in the ordinary diet of farm animals and poultry and various expedients have been employed for supplementing these minerals in the diet. The mixture of these mineral elements should be presented to the animal in such form that it may be readily partaken of but, at the same time, is not subject to loss due to rain or wind or because of the spreading of the same over the ground by the animal or bird.

The formation of the mineral ingredients into a block is desirable from the standpoint that the mineral is not lost due to being spread around and trampled into the ground or blown away but the mineral blocks heretofore known are held together by bonding materials which have the faults that under the drying action of the sun and wind they become so extremely hard that the animal cannot readily obtain the mineral and, under the rain, the formed material disintegrates and the mineral matter is washed away and lost.

The primary object of the present invention is the provision of a formed mineral mixture which does not become so hard as to decrease its availability as a feed and which is waterproof to such an extent that it does not disintegrate in the presence of moisture.

A further object of the invention is the provision of a process for the manufacture of mineral blocks whereby the same are quickly formed and in which the percentage of drying bonding material used may be decreased over present practices.

For purposes of illustration a preferred form of the invention is hereinafter described. It is to be understood, however, that this disclosure is for purposes of exemplification only and is not to be construed as unnecessarily limiting the scope of the invention as defined by the appended claims.

Although the kinds of mineral ingredients used in the block are not an essential part of the invention, a satisfactory block may be formed from steamed bone meal, acid phosphate, rock phosphate and bone black or similar sources of phosphorus, materials containing calcium, such as calcium carbonate, materials containing iron in the form of ferric oxide or ferrous sulphate and sources of copper and manganese in the form of sulphates. In addition there may be added potassium iodide, sodium sulphate, charcoal, bicarbonate of soda, sulphur and possibly some sodium chloride.

The ingredients are finely divided and thoroughly mixed and have added thereto a mixture consisting of 4 per cent of melted paraffin, 4 per cent of blackstrap molasses and 4 per cent of hydrol and possibly a small amount of water. Paraffin, blackstrap molasses and hydrol, which are hereinafter referred to as the binding ingredients, are heated and sprayed while very hot into the mixture of the dry ingredients. The mixing is continued for a sufficient length of time to insure a thorough mixture, which usually requires about fifteen minutes. The material is then moulded into the form of blocks by being subjected to pressure. Generally, pressures ranging from one thousand to two thousand pounds per square inch are employed.

The paraffin in the block bonds very quickly and forms a mass sufficiently firm to withstand the necessary handling which follows the forming operation. The action of the hydrol and the molasses is somewhat slower. The reason for the different rates of bonding is because paraffin has its bonding effect upon cooling whereas the bonding effect of hydrol and molasses is the result of drying.

The quick binding effect of cooling bonding material is an advantage from the standpoint of manufacture in that the formed material is immediately firm and thus there is less loss due to breaking or crumbling of the block than is the case if only a drying bonding material is used.

It has been the general practice, when using only a drying bonding agent, in order to permit handling of the block after it is formed, to provide an excess of bonding material. It is apparent, therefore, that by the use of a cooling bonding material such as paraffin it is possible to substantially decrease the amount of bonding material necessary. Consequently, only about one-half to two-thirds of the regular amount of drying bonding material is necessary.

The action of the paraffin in the block, from the standpoint of waterproofing the same, is probably that its presence in the small capillaries repels any moisture coming in contact with the block. While the presence of the paraffin might have some effect in retaining moisture within the block in all probability the reason that the block does not become hard due to the action of the sun and wind is that the paraffin, being a weak binder and the hydrol and molasses being strong binders, relatively speaking the paraffin is in substance an anti-binder in relation to the hydrol and molasses when the latter have dried, consequently it prevents the block from becoming extremely hard and permits the animal to take off portions of the formed material. Another factor which may help to account for the formed material not becoming extremely hard is that by using a quick binder it is not necessary to have as much of the slow binding material in the product.

The preceding description being of a specific embodiment of the invention, paraffin has been referred to as the quick, cooling bonding material and the water repellent agent. Obviously, however, various materials which are plastic or fluid when hot and semi-solid or solid at ordinary temperatures such, for example, as beeswax, ceresin, wax tailings or the like might be substituted for the paraffin. Hydrol and molasses have been referred to as the slower drying bonding material. Molasses is used because of its flavor although, obviously, the drying bonding material might be entirely hydrol or entirely molasses or in lieu of either or both other drying bonding materials such as dextrose, starch, glue or casein might be used. Throughout the specification the form of the material has been referred to as block form although other forms might be employed such as pellets, granules or the like wherein similar bonding effect is desirable.

We claim:

1. The method of manufacturing formed mineral matter for feeding which comprises adding to finely divided mineral matter a quick acting bonding material and a slow acting bonding material and forming the same.

2. The method of manufacturing mineral feed which comprises finely dividing the mineral matter, adding hot paraffin thereto and a second bonding material which becomes effective on drying, and forming the same.

3. The method of manufacturing formed mineral feed which comprises adding to finely divided mineral matter hot paraffin, hydrol and molasses, thoroughly mixing the same and forming the mixture under pressure.

4. A formed mineral mixture comprising finely divided mineral matter and two bonding materials, one of which is paraffin and the other molasses and hydrol.

5. The method of manufacturing formed mineral feed which comprises mixing the feed and during the mixing operation spraying thereon hot paraffin, blackstrap molasses and hydrol, admixing the paraffin, blackstrap molasses and hydrol thoroughly into the mineral mixture, and forming the mixture into blocks under pressure.

6. The method of manufacturing mineral blocks for feeding which comprises adding to finely divided mineral matter a hot quick acting bonding material having water repellent properties and having its bonding effect as the result of cooling, a second slow acting bonding material which becomes effective on drying, and forming the same.

M. DOUGLAS KNAPHEIDE.
PAUL CALDWELL.
WALLACE P. ELMSLIE.